(12) United States Patent
Lopez et al.

(10) Patent No.: US 8,268,042 B2
(45) Date of Patent: Sep. 18, 2012

(54) POLYMER INORGANIC CLAY COMPOSITES

(75) Inventors: Leonardo C. Lopez, Midland, MI (US); Scott T. Matteucci, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 483 days.

(21) Appl. No.: 12/623,334

(22) Filed: Nov. 20, 2009

(65) Prior Publication Data

US 2010/0126342 A1 May 27, 2010

Related U.S. Application Data

(60) Provisional application No. 61/117,806, filed on Nov. 25, 2008.

(51) Int. Cl.
| | |
|---|---|
| B01D 53/22 | (2006.01) |
| B01J 21/16 | (2006.01) |
| C08J 5/22 | (2006.01) |
| H01B 1/12 | (2006.01) |

(52) U.S. Cl. ............... 95/52; 95/45; 96/4; 96/7; 96/11; 96/12; 521/25; 521/27; 252/62; 252/519.33; 502/439

(58) Field of Classification Search ............... 95/45, 52; 96/4, 7, 9, 11, 12; 521/25, 27; 252/62, 519.33; 502/439
See application file for complete search history.

(56) References Cited

U.S. PATENT DOCUMENTS

| | | | |
|---|---|---|---|
| 3,267,065 A * | 8/1966 | Shaler, Jr. et al. | ............... 521/25 |
| 4,739,007 A | 4/1988 | Okada et al. | |
| 6,034,163 A | 3/2000 | Barbee et al. | |
| 6,172,167 B1 | 1/2001 | Stapert et al. | |
| 7,029,559 B2 * | 4/2006 | Won et al. | ............... 521/27 |
| 7,357,999 B2 * | 4/2008 | Kim | ............... 521/27 |
| 2006/0240304 A1 * | 10/2006 | Sandi-Tapia et al. | ............... 96/4 |
| 2007/0093588 A1 * | 4/2007 | Takahashi et al. | ............... 524/445 |
| 2007/0137477 A1 | 6/2007 | Freeman et al. | |
| 2008/0214743 A1 | 9/2008 | Broos et al. | |
| 2008/0312349 A1 * | 12/2008 | Yeager et al. | ............... 521/27 |
| 2009/0226744 A1 * | 9/2009 | Dinega | ............... 521/25 |
| 2010/0041292 A1 | 2/2010 | Kim et al. | |
| 2010/0041857 A1 | 2/2010 | Harris et al. | |
| 2010/0126341 A1 | 5/2010 | Matteucci et al. | |
| 2010/0127434 A1 | 5/2010 | Broos et al. | |
| 2010/0129591 A1 | 5/2010 | Lopez et al. | |
| 2010/0129634 A1 | 5/2010 | Lopez et al. | |
| 2010/0129641 A1 | 5/2010 | Lopez et al. | |
| 2010/0137478 A1 | 6/2010 | White et al. | |

FOREIGN PATENT DOCUMENTS

| | | |
|---|---|---|
| WO | 2007030791 | 3/2007 |
| WO | 2007099397 | 9/2007 |
| WO | 2008002868 | 1/2008 |
| WO | 2008002869 | 1/2008 |

(Continued)

OTHER PUBLICATIONS

Krook, M. et al., Barrier and Mechanical Properties of Injection Molded Montmorillonite/Polyesteramide Nanocomposites, Polymer Engineering and Science, 2005, vol. 45, No. 1, pp. 135-141.*

(Continued)

Primary Examiner — Jason M Greene (57) ABSTRACT

The instant invention generally provides polymer inorganic clay composite comprising a molecularly self-assembling material and an inorganic clay, and a process of making and an article comprising the polymer inorganic clay composite.

18 Claims, 6 Drawing Sheets

FOREIGN PATENT DOCUMENTS

| WO | 2008101051 | | 8/2008 |
|---|---|---|---|
| WO | 2008112833 | | 9/2008 |
| WO | WO 2008/112833 A1 | * | 9/2008 |
| WO | 2008150970 | | 12/2008 |
| WO | 2009134824 | | 11/2009 |

OTHER PUBLICATIONS

Ciferri, Alberto, "Supramolecular Polymers", Second Edition, 2005, pp. 157-158, CRC Press.

Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-182.

Fornes et al., "Nylon 6 nanocomposites: the effect of matrix molecular weight", Polymer, 2001, vol. 42, pp. 9929-9940, Elsevier Science Ltd.

Kang et al., "Novel Application of Partially Positively Charged Silver Nanoparticles for Facilitated Transport in Olefin/ Paraffin Separation Membranes", Chemistry of Materials, 2008, vol. 20 No. 4, pp. 1308-1311.

Koevoets et al., "Molecular Recognition in a Thermoplastic Elastomer", Journal of the American Chemical Society, 2005, pp. 2999-3003, vol. 127.

Krook et al., "Barrier and Mechanical Properties of Injection Molded Montmorillonite/Polyesteramide Nanocomposites", Polymer Engineering and Science, 2005, vol. 45 No. 1, pp. 135-141.

Lips et al., "Incorporation of different crystallizable amide blocks in segmented poly(ester amide)s", Polymer, 2005, pp. 7834-7842, vol. 46, Elsevier Ltd.

Lips et al., "Synthesis and characterization of poly(ester amide)s containing crystallizable amide segments", Polymer, 2005, pp. 7823-7833, vol. 46, Elsevier Ltd.

Matteucci et al., "Gas Permeability, Solubility, and Diffusion Coefficients in 1,2-Polybutadiene Containing Magnesium Oxide", Macromolecules, 2008, vol. 41, pp. 2144-2156, American Chemical Society.

Picard et al., "Water Transport Properties of Polyamide 6 based nanocomposites prepared by melt blending: On the importance of the clay dispersion state on the water transport properties at high water activity", Journal of Membrane Science, 2008, vol. 313, 284-295, Elsevier B.V.

* cited by examiner

POLYMER INORGANIC CLAY COMPOSITES

CROSS-REFERENCE TO RELATED APPLICATION(S)

This application claims benefit of priority from U.S. Provisional Patent Application No. 61/117,806, filed Nov. 25, 2008, which application is incorporated by reference herein in its entirety.

The present invention is in the field of polymer inorganic clay composites.

BACKGROUND OF THE INVENTION

There is a need in the polymer art for new polymer inorganic clay composites, and articles comprising the polymer inorganic clay composites.

SUMMARY OF THE INVENTION

The instant invention generally provides polymer inorganic clay composite comprising a molecularly self-assembling material and an inorganic clay, and a process of making and an article comprising the polymer inorganic clay composite.

In a first embodiment, the instant invention is a polymer inorganic clay composite comprising a molecularly self-assembling (MSA) material and an inorganic clay dispersed in the MSA material, wherein the inorganic clay comprises a cation exchanging layered material and inorganic cations, the cation exchanging layered material having a cation exchanging capacity, and the inorganic clay having at least one dimension that is less than 3 micrometers and comprising from 1 weight percent (wt %) to 90 wt % of the polymer inorganic clay composite based on total weight of the polymer inorganic clay composite. The inorganic clay is not magadiite or a synthetic hydrous magnesium silicate clay. The inorganic cations consist essentially of native inorganic cations (i.e., lack active inorganic cations), consist essentially of active inorganic cations (i.e., lack native inorganic cations), or comprise a mixture of native and active inorganic cations.

In a second embodiment, the instant invention is a process for making the polymer inorganic clay composite of the first embodiment, the process comprising a step of: contacting under mixing conditions a desired amount of the inorganic clay to either a melt of the MSA material or a solution comprising a solvent and the MSA material to produce a first polymer inorganic clay composite of the first embodiment. Preferably the process employs the melt of the MSA material. In some embodiments, the contacting step comprises exfoliatably contacting under exfoliating conditions. In some embodiments, the inorganic clay, and hence the first polymer inorganic clay composite, comprises native inorganic cations, and the process further comprises steps of contacting the first polymer inorganic clay composite with an inorganic cation exchange material comprising active inorganic cations; and exchanging at least some of the native cations of the first polymer inorganic clay composite for at least some of the active inorganic cations of the inorganic cation exchange material to produce a second polymer inorganic clay composite of the first embodiment, wherein the second polymer inorganic clay composite comprises active inorganic cations.

In a third embodiment, the instant invention is an article comprising the polymer inorganic clay composite of the first embodiment. Preferably, the article comprises a gas permeable material, more preferably a gas permeable membrane.

In some embodiments, the gas permeable membrane becomes decreasingly permeable to a permeation-resistant gas and increasingly permeable to water at increasingly higher weight percents of the inorganic clay in the polymer inorganic clay composite of the first embodiment comprising the gas permeable membrane.

In a fourth embodiment, the instant invention is a process for separating water vapor from a hydrous gas mixture, the process comprising the steps of: providing a gas permeable material comprising an effective amount of the polymer inorganic clay composite of the first embodiment, the gas permeable material having spaced-apart entrance and exit faces; and contacting a hydrous gas mixture comprising water vapor and a permeation-resistant gas to the entrance face of the gas permeable material; and removing from the exit (downstream) face of the gas permeable material a first permeant gas containing a first amount of at least some of the water vapor from the hydrous gas mixture. Preferably, the gas permeable material is a barrier material or a gas permeable membrane, more preferably the gas permeable membrane.

Additional embodiments of the present invention are illustrated in the accompanying drawings and are described in the following detailed description and claims.

DETAILED DESCRIPTION OF THE INVENTION

As used herein, "a," "an," "the," "at least one," and "one or more" are used interchangeably. In any embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like. When referring to a list of elements (e.g., ingredients), the phrases "mixture thereof," "combination thereof," and the like mean any two or more, including all, of the listed elements.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls. The present specification may be subsequently amended to incorporate by reference subject matter from a U.S. patent or U.S. patent application publication, or portion thereof, instead of from a PCT international patent application or WO publication equivalent, or portion thereof, originally referenced herein, provided that no new matter is added and the U.S. patent or U.S. patent application publication claims priority directly from the PCT international patent application.

In the present application, headings (e.g., "Definitions") are used for convenience and are not meant, and should not be used, to limit scope of the present disclosure in any way.

In the present application, any lower limit of a range of numbers, or any preferred lower limit of the range, may be combined with any upper limit of the range, or any preferred upper limit of the range, to define a preferred embodiment of the range. Each range of numbers includes all numbers subsumed within that range (e.g., the range from about 1 to about 5 includes, for example, 1, 1.5, 2, 2.75, 3, 3.80, 4, and 5).

In an event where there is a conflict between a unit value that is recited without parentheses, e.g., 2 inches, and a corresponding unit value that is parenthetically recited, e.g., (5 centimeters), the unit value recited without parentheses controls.

Definitions

As used herein, the terms "cation exchange capacity" and "cation exchanging capacity" of a cation exchanging layered material are synonymous and represent an amount of a set of exchangeable cations and describes a capability to replace one set of exchangeable cations (typically a capability to replace, if desired, native inorganic ions such as sodium cation ($Na^+$), calcium cation ($Ca^{+2}$) or hydrogen cation ($H^+$)) with another set of cations, preferably active inorganic cations. Active inorganic cations are derived from an inorganic cation exchange material, which is described elsewhere herein. The term "exchangeable cations" means monovalent cations, polyvalent cations, or a mixture thereof, each cation having a formal positive charge.

The term "cation exchanging layered material" means a substance derived from a swellable (using the swelling liquid useful in the present invention) inorganic solid (natural or synthetic) comprised of negatively-charged layers (also known as sheets or platelets) and having a cation exchanging capacity (which is substantially exchangeable in a swollen state). Cations balance (i.e., neutralize) the negative charge of the cation exchanging layered material. The inorganic solid preferably is a swellable, natural or synthetic inorganic clay. The inorganic clay preferably comprises layers of negatively charged material and inorganic cations.

The term "desired amount" means a weight sufficient for producing an intended composite.

The term "dispersed" means distributed substantially evenly throughout a medium (e.g., a polymer).

The term "downstream permeant gas" means a gaseous or vaporous substance comprising water (i.e., water from the hydrous gas mixture) that leaves the gas permeable material from its exit face in the process of the fourth embodiment.

The term "effective amount" means a quantity of the polymer inorganic clay composite of the first embodiment sufficient to separate from greater than 0% to 100%, of the water vapor from the hydrous gas mixture and into the permeant gas. Preferably, the effective amount is sufficient to ultimately separate at least 10%, more preferably at least 20%, still more preferably at least 30%, and even more preferably at least 60% of the water vapor from the hydrous gas mixture and into the permeant gas that is ultimately produced by the process of the fourth embodiment (ultimate permeant gas).

The term "exfoliatably contacting" and phrase "under exfoliating conditions" are essentially synonymous and mean mixing an inorganic clay capable of being exfoliated in a medium under conditions facilitating mechanical separation (e.g., via shear) of at least some layers of the inorganic clay to produce a mixture, suspension, or distribution of an exfoliated inorganic clay, wherein the exfoliated inorganic clay is distributed substantially evenly throughout the medium (e.g., a polymer).

The term "exfoliated" means, for present purposes, that the cation exchanging layered material is partially or fully delaminated such that at least 10% of particles thereof have at least one dimension that is less than 100 nm. Preferably, the cation exchanging layered material is delaminated into first components, each independently having one, two, three, four, five, six, seven, eight, nine, or ten layers of cation exchanging layered material and, optionally, second components, each independently having more than ten layers of cation exchanging layered material, the volume percent of all of the first components being greater than the volume percent of all of the second components upon examination by transmission electron microscopy of a representative sample of polymer composite. That is, the cation exchanging layered material need not be completely exfoliated into one-layer components, but may exist as a mixture of components having varying numbers of layers as described.

The term "gas permeable material" means a substance comprising the polymer inorganic clay composite of the first embodiment through which water gas or vapor passes at a higher permeation rate than a permeation rate of the permeation-resistant gas. The gas permeable material may be in any construction such as, for example, a particulate packing material (e.g., for use in a gas filter cartridge) and a membrane, which may be in the form of, for example, a plaque, film, or rolled sheet (e.g., a cylinder), or an asymmetric membrane.

The term "hydrous gas mixture" means a composition comprising water (gaseous or vaporous) and at least one permeation-resistant gas. In some embodiments, the hydrous gas mixture consists essentially of water and only one permeation-resistant gas or, in other embodiments, water and two or more permeation-resistant gases. Examples of the hydrous gas mixture are air, hydrous oxygen, hydrous nitrogen, and hydrous hydrogen. Preferably, each gaseous or vaporous substance is characterized as having a normal boiling point at standard pressure (i.e., 101 kiloPascals (kPa)) of about 200° C. or lower, more preferably about 120° C. or lower, still more preferably about 50° C. or lower, and even more preferably about 0° C. or lower.

The term "inorganic cation exchange material" means a substance comprising active inorganic cations and their associated counter anions (e.g., carbonate ($CO_3^{2-}$), halide (e.g., chloride ($Cl^-$)), hydroxide (e.g., $HO^-$), and oxide ($O^{2-}$)). The term "active inorganic cation" means a cation of a metal of any one of Groups 3 to 12 of the Periodic Table of the Elements. The active inorganic cations may be the same or different.

The term "native inorganic cation" means a cation of a metal from any one of groups 1, 2, 13, and 14 of the Periodic Table of the Elements. More preferred are lithium cation ($Li^+$), sodium cation ($Na^+$), and potassium cation ($K^+$). Other native inorganic cations include magnesium cation ($Mg^{2+}$), calcium cation ($Ca^{2+}$), and a silicon atom having a formal charge of +4.

Unless otherwise noted, the phrase "Periodic Table of the Elements" refers to the periodic table, version dated Jun. 22, 2007, published by the International Union of Pure and Applied Chemistry (IUPAC).

The term "permeation rate" means the rate at which gas moves across a membrane, and is often reported in barrier units. One barrier equals $10^{-10}$ $(cm^3$ gas)*cm/$(cm^2$*s*cmHg), wherein * means multiplication, /means division, ($cm^3$ gas) means moles of the gas in 1 cubic centimeter at standard temperature (25° C.) and pressure (76 cmHg, i.e., 101 kiloPascals); cm means thickness in centimeters of the membrane, $cm^2$ means surface area of the membrane, s means time in seconds, and mmHg and cmHg mean respective testing pressure of the gas in millimeters or centimeters of mercury. Permeability can be measured using, for instance, a procedure of ASTM D1434. For purposes of the instant invention, however, permeability of the permeation-resistant gas is measured according to the oxygen permeability method described later and permeability of water is measured according to the water permeability method described later.

The term "permeation-resistant gas" means a gaseous or vaporous substance other than water that is inhibited, slowed, or stopped from passing through (e.g., by diffusion or other means) the gas permeable material.

The "polymer inorganic clay composite" is, in aggregate, neutral. Counter anions for neutralizing cations such as, for example, the active inorganic cations of the polymer inorganic clay composite, can be contained in any component of, or sourced from any precursor material (e.g., inorganic clay) to, the polymer inorganic clay composite, including in or from the MSA material (e.g., in a form of a —COO⁻ group).

The term "removing" (from the exit face of the gas permeable material) means passively (e.g., allowing diffusion) or actively (applying a vacuum source or sweeping with a carrier gas) transporting away.

The term "$T_g$" means glass transition temperature as determined by differential scanning calorimetry (DSC).

The term "$T_m$" means melting temperature as determined by DSC. If a MSA material has one or more $T_m$, preferably at least one $T_m$ is 25° C. or higher.

For purposes herein, determine $T_g$ and $T_m$ according to the following procedure. Load a sample weighing between 5 milligrams (mg) and 10 mg into an aluminum hermetic DSC pan. Sequentially expose the sample to a first heating scan, holding step, cooling step, and a second heating scan. Particularly, in the first heating scan, heat the sample to 200° C. at a heating rate of 10° C. per minute. Hold the sample at 200° C. for 1 minute, and then cool the sample to −80° C. at a cooling rate of 10° C. per minute. Then in the second heating scan, heat the cooled sample to 200° C. at a heating rate of 10° C. per minute. Determine thermal events such as $T_g$ and $T_m$ from the second heating scan.

The term "viscosity" means zero shear viscosity unless specified otherwise.

Unless otherwise indicated, each "weight percent" of a component of a multicomponent material is determined by dividing weight of the component by total weight of the multicomponent material, and multiplying the result by 100.

Permeation-Resistant Gas

In some embodiments, the permeation-resistant gas is acidic, neutral, basic, pi-bond (π-bond) containing, or any combination thereof. Examples of acidic permeation-resistant gases are carbon dioxide ($CO_2$), sulfur dioxide ($SO_2$), hydrogen sulfide ($H_2S$), and hydrogen chloride (HCl). Examples of neutral permeation-resistant gases are oxygen ($O_2$), carbon monoxide (CO), hydrogen ($H_2$), synthesis gas (a variable mixture of CO and $H_2$), unsubstituted alkane, and inert gases such as, for example, nitrogen ($N_2$), helium (He), and argon (Ar). Examples of basic permeation-resistant gases are ammonia ($NH_3$) and trimethylamine ($N(CH_3)_3$). Examples of pi-bond-containing permeation-resistant gases are the olefins described above and carbocyclic aromatic compounds (e.g., benzene) and heterocyclic aromatic compounds (e.g., pyridine and furan). In some embodiments, the permeation-resistant gas comprises a naturally-occurring hydrous gas mixture such as, for example, air and natural gas. In other embodiments, the permeation-resistant gas comprises a manufactured hydrous gas mixture.

Inorganic Clays

In some embodiments, the inorganic cations consist essentially of native inorganic cations, that is the cation exchanging capacity of the inorganic clay is 0 mole percent (mol %) exchanged (i.e., not exchanged) for the active inorganic cations. In other embodiments, the inorganic cations consist essentially of active inorganic cations, that is the cation exchanging capacity is 100 mol % or more exchanged for the active inorganic cations (i.e., at least some of the native inorganic cations are replaced with the active inorganic cations). In still other embodiments, the inorganic cations consist essentially of the mixture of native and active inorganic cations; that is the cation exchanging capacity is from greater than 0 mol % to less than 100 mol % exchanged, preferably from 20 mol % to 99 mol % exchanged, with the active inorganic cations. Preferably the cation exchanging capacity is at least 20 mol % exchanged, more preferably at least 50 mol % exchanged, still more preferably at least 75 mol % exchanged, and even more preferably at least 100 mol % exchanged with the active inorganic cations. Where the cation exchange capacity of the inorganic clay is less than 100 mol % exchanged with the active inorganic cations, preferably, the remainder of the cation exchanging capacity is unexchanged native inorganic cations.

In other embodiments, the cation exchanging capacity of the inorganic clay is more than 100 mol % exchanged with the active inorganic cations. That is, all of the charge-neutralizing native inorganic cations and at least some additional native inorganic cations have been exchanged for active inorganic cations. In such embodiments, the inorganic clay lacks native inorganic cations.

Native inorganic cations of the inorganic clay may be exchanged for active inorganic cations by contacting the inorganic clay having native inorganic cations with a solution comprising the active inorganic cations and an ion exchange solvent. A preferred ion exchange solvent is water, methanol, acetone, formic acid, or a mixture thereof. More preferred is water.

The cation exchange capacity of the inorganic clay may be measured by several methods, most of which perform an actual exchange reaction and analyze the resulting product for the presence of each of the exchanging ions. Thus, the stoichiometry of exchange preferably is determined on a mole percent (mol %) basis. Preferably, the cation exchange capacities of commercially available inorganic clays are provided by commercial suppliers of the inorganic clays.

While the particular method used to measure the cation exchange capacity of the inorganic clay is not important to the present invention, preferably, the cation exchange capacity of the inorganic clay may be measured using the procedure described on page 155 of *Composition and Properties of Oil Well Drilling Fluids*, $4^{th}$ edition, George R. Gray and H. C. H. Darley, 1980, Gulf Publish Company, Houston, Tex., USA. One method of Gray and Darley involves leaching a first sample of an inorganic clay with excess of a suitable salt such as, for example, ammonium acetate to provide a first filtrate and leaching a second sample of the inorganic clay with water to provide a second filtrate. Separately analyzing the first and second filtrates for common exchange cations by conventional means provides a milliequivalents (mEQ, defined below) of each species of cation adsorbed on the clay and, thus, total mEQ, i.e., cation exchange capacity (CEC), of all species of cations. The term "milliequivalents" (mEQ) equals millimole equivalents of cation exchange capacity; for example, 125 mEQ means 0.125 moles of cation exchange capacity.

The inorganic clay (i.e., inorganic cation exchanging layered material) useful in the present invention (e.g., a silicate clay or 2:1 silicate clay in its natural state or washed with purified water) preferably has a negative charge on its surface of at least 20 mEQ, more preferably at least 50 mEQ, and preferably 200 mEQ or less, more preferably 150 mEQ or less, still more preferably 125 mEQ or less, per 100 grams (g) of the material.

Preferably, the inorganic clay is a natural inorganic clay (consisting essentially of native inorganic cations), more preferably a natural layered silicate (such as a kenyaite), layered 2:1 silicate (such as a natural smectite, hormite, vermiculite, illite, mica, and chlorite), or sepiolite, or the inorganic clay is derived by exchanging at least some of the native inorganic cations of the natural inorganic clay for active inorganic cations. Examples of preferred inorganic clays are layered silicates (such as kenyaite), layered 2:1 silicates (such as natural and synthetic smectites, hormites, vermiculites, illites, micas, and chlorites), and sepiolites. Preferably, the cation exchanging layered material is derived from a natural montmorillonite, mica, fluoromica, sepiolite, nontronite, bentonite, kaolinite, beidellite, volkonskonite, hectorite, fluorohectorite, saponite, sauconite, stevensite, attapulgite, halloysite, medmontite, kenyaite, or vermiculite, or a mixture of two or more thereof. More preferably, the cation exchanging layered material is derived from a natural mica, fluoromica, montmorillonite, or sepiolite. The inorganic clay is not magadiite or a synthetic hydrous magnesium silicate clay (e.g., LAPONITE®, Rockwood Additives Limited, Cheshire, England). In some embodiments, the cation exchanging layered material is derived from a synthetic inorganic clay other than magadiite and a synthetic hydrous magnesium silicate clay. Preferably, the synthetic inorganic clay is a synthetic mica (such as, for example, SOMASIF ME-100, Co-Op Chemicals, Japan) or montmorillonite (e.g., CLOISITE™ Na+, Southern Clay Products, Inc., USA).

Molecularly Self-Assembling Material

As used herein a MSA material means an oligomer or polymer that effectively forms larger associated or assembled oligomers and/or polymers through the physical intermolecular associations of chemical functional groups. Without wishing to be bound by theory, it is believed that the intermolecular associations do not increase the molecular weight (Mn—Number Average molecular weight) or chain length of the self-assembling material and covalent bonds between said materials do not form. This combining or assembling occurs spontaneously upon a triggering event such as cooling to form the larger associated or assembled oligomer or polymer structures. Examples of other triggering events are the shear-induced crystallizing of, and contacting a nucleating agent to, a molecularly self-assembling material. Accordingly, in preferred embodiments MSAs exhibit mechanical properties similar to some higher molecular weight synthetic polymers and viscosities like very low molecular weight compounds. MSA organization (self-assembly) is caused by non-covalent bonding interactions, often directional, between molecular functional groups or moieties located on individual molecular (i.e. oligomer or polymer) repeat units (e.g. hydrogen-bonded arrays). Non-covalent bonding interactions include: electrostatic interactions (ion-ion, ion-dipole or dipole-dipole), coordinative metal-ligand bonding, hydrogen bonding, π-π-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K (assoc) constant describing the relative energetic interaction strength of a chemical complex or group of complexes having multiple hydrogen bonds. Such complexes give rise to the higher-ordered structures in a mass of MSA materials. A description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl, etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

Accordingly, the molecularly self-assembling materials (MSA) include: molecularly self-assembling polyesteramides, copolyesteramide, copolyetheramide, copolyetherester-amide, copolyetherester-urethane, copolyether-urethane, copolyester-urethane, copolyester-urea, copolyetherester-urea and their mixtures. Preferred MSA include copolyesteramide, copolyether-amide, copolyester-urethane, and copolyether-urethanes. The MSA preferably has number average molecular weights, $MW_n$ (interchangeably referred to as $M_n$) (as is preferably determined by NMR spectroscopy) of 2000 grams per mole or more, more preferably at least about 3000 g/mol, and even more preferably at least about 5000 g/mol. The MSA preferably has $MW_n$ 50,000 g/mol or less, more preferably about 20,000 g/mol or less, yet more preferably about 15,000 g/mol or less, and even more preferably about 12,000 g/mol or less. The MSA material preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4-6, and still more preferably at least 4 donor-acceptor hydrogen bonding moieties per molecularly self-assembling unit. Molecularly self-assembling units in preferred MSA materials include bis-amide groups, and bis-urethane group repeat units and their higher oligomers.

Preferred self-assembling units in the MSA material useful in the present invention are bis-amides, bis-urethanes and bis-urea units or their higher oligomers. A more preferred self-assembling unit comprises a poly(ester-amide), poly(ether-amide), poly(ester-urea), poly(ether-urea), poly(ester-urethane), or poly(ether-urethane), or a mixture thereof. For convenience and unless stated otherwise, oligomers or polymers comprising the MSA materials may simply be referred to herein as polymers, which includes homopolymers and interpolymers such as co-polymers, terpolymers, etc.

In some embodiments, the MSA materials include "non-aromatic hydrocarbylene groups" and this term means specifically herein hydrocarbylene groups (a divalent radical formed by removing two hydrogen atoms from a hydrocarbon) not having or including any aromatic structures such as aromatic rings (e.g. phenyl) in the backbone of the oligomer or polymer repeating units. In some embodiments, non-aromatic hydrocarbylene groups are optionally substituted with various substituents, or functional groups, including but not limited to: halides, alkoxy groups, hydroxy groups, thiol groups, ester groups, ketone groups, carboxylic acid groups, amines, and amides. A "non-aromatic heterohydrocarbylene" is a hydrocarbylene that includes at least one non-carbon atom (e.g. N, O, S, P or other heteroatom) in the backbone of the polymer or oligomer chain, and that does not have or include aromatic structures (e.g., aromatic rings) in the backbone of the polymer or oligomer chain. In some embodiments, non-aromatic heterohydrocarbylene groups are optionally substituted with various substituents, or functional groups, including but not limited to: halides, alkoxy groups, hydroxy groups, thiol groups, ester groups, ketone groups, carboxylic acid groups, amines, and amides. Heteroalkylene is an alkylene group having at least one non-carbon atom (e.g. N, O, S or other heteroatom) that, in some embodiments, is optionally substituted with various substituents, or functional groups, including but not limited to: halides, alkoxy groups, hydroxy groups, thiol groups, ester groups, ketone groups, carboxylic acid groups, amines, and amides. For the purpose of this disclosure, a "cycloalkyl" group is a saturated carbocyclic radical having three to twelve carbon atoms, preferably three to seven. A "cycloalkylene" group is an unsaturated carbocyclic radical having three to twelve carbon atoms, preferably three to seven. Cycloalkyl and cycloalkylene groups independently are monocyclic or polycyclic fused systems as long as no aromatics are included. Examples of carbocyclic radicals include cyclopropyl, cyclobutyl, cyclopentyl, cyclohexyl and cycloheptyl. In some embodiments, the groups herein are optionally substituted in one or more substitutable positions as would be known in the art. For example in some embodiments, cycloalkyl and cycloalkylene groups are optionally substituted with, among others, halides, alkoxy groups, hydroxy groups, thiol groups, ester groups, ketone groups, carboxylic acid groups, amines, and amides. In some embodiments, cycloalkyl and cycloalkene groups are optionally incorporated into combinations with other groups to form additional substituent groups, for example: "-Alkylene-cycloalkylene-", "-alkylene-cycloalkylene-alkylene-", "-heteroalkylene-cycloalkylene-", and "-heteroalkylene-cycloalkyl-heteroalkylene" which refer to various non-limiting combinations of alkyl, heteroalkyl, and cycloalkyl. These combinations include groups such as oxydialkylenes (e.g., diethylene glycol), groups derived from branched diols such as neopentyl glycol or derived from cyclo-hydrocarbylene diols such as Dow Chemical's UNOXOL® isomer mixture of 1,3- and 1,4-cyclohexanedimethanol, and other non-limiting groups, such -methylcylohexyl-, -methyl-cyclohexyl-methyl-, and the like. "Heterocycloalkyl" is one or more cyclic ring systems having 4 to 12 atoms and, containing carbon atoms and at least one and up to four heteroatoms selected from nitrogen, oxygen, or sulfur. Heterocycloalkyl includes fused ring structures. Preferred heterocyclic groups contain two ring nitrogen atoms, such as piperazinyl. In some embodiments, the heterocycloalkyl groups herein are optionally substituted in one or more substitutable positions. For example in some embodiments, heterocycloalkyl groups are optionally substituted with halides, alkoxy groups, hydroxy groups, thiol groups, ester groups, ketone groups, carboxylic acid groups, amines, and amides.

Examples of MSA materials useful in the present invention are poly(ester-amides), poly(ether-amides), poly(ester-ureas), poly(ether-ureas), poly(ester-urethanes), and poly (ether-urethanes), and mixtures thereof that are described, with preparations thereof, in United States Patent Number (USPN) U.S. Pat. No. 6,172,167; and applicant's co-pending PCT application numbers PCT/US2006/023450, which was renumbered as PCT/US2006/004005 and published under PCT International Patent Application Number (PCT-IPAPN) WO 2007/099397 and U.S. Patent Application Publication Number (USPAPN) 2008-0214743; PCT/US2006/035201, which published under PCT-IPAPN WO 2007/030791; PCT/U.S.08/053,917, which published under PCT-IPAPN WO 2008/101051; PCT/U.S.08/056,754, which published under PCT-IPAPN WO 2008/112833; and PCT/U.S.08/065,242. Preferred said MSA materials are described below.

In a set of preferred embodiments, the molecularly self-assembling material comprises ester repeat units of Formula I:

Formula I and at least one second repeat unit selected from the esteramide units of Formula II and III:

Formula II

Formula III and the ester-urethane units of Formula IV:

Formula IV wherein

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene- (including dimethylene cyclohexyl groups). Preferably, these aforementioned specific groups are from 2 to 12 carbon atoms, more preferably from 3 to 7 carbon atoms. The $C_2$-$C_{20}$ non-aromatic hydrocarbylene groups are at each occurrence, independently specifically groups, non-limiting examples including: -hetereoalkylene-, -heteroalkylene-cycloalkylene-, -cycloalkylene-heteroalkylene-, or -heteroalkylene-cycloalkylene-heteroalkylene-, each aforementioned specific group preferably comprising from 2 to 12 carbon atoms, more preferably from 3 to 7 carbon atoms. Preferred heteroalkylene groups include oxydialkylenes, for example diethylene glycol (—$CH_2CH_2OCH_2CH_2$—O—). When R is a polyalkylene oxide group it preferably is a polytetramethylene ether, polypropylene oxide, polyethylene oxide, or their combinations in random or block configuration wherein the molecular weight (Mn—average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is —$(CH_2)_4$—.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably —$(CH_2)_4$—.

$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is —$(CH_2)_2$—, —$(CH_2)_3$—, —$(CH_2)_4$—, or —$(CH_2)_5$—.

$R^N$ is at each occurrence —$N(R^3)$—Ra—$N(R^3)$—, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms, wherein each nitrogen atom is bonded to a carbonyl group according to Formula II or III above; w represents the ester mol fraction, and x, y and z represent the amide or urethane mole fractions where w+x+y+z=1, 0<w<1, and at least one of x, y and z is greater than zero. Ra is a $C_2$-$C_{20}$ non-aromatic hydrocarbylene group, more preferably a $C_2$-$C_{12}$ alkylene: most preferred Ra groups are ethylene butylene, and hexylene —$(CH_2)_6$—. In some embodiments, $R^N$ is piperazin-1,4-diyl. According to another embodiment, both $R^3$ groups are hydrogen.

n is at least 1 and has a mean value less than 2.

In an alternative embodiment, the MSA is a polymer consisting of repeat units of either Formula II or Formula III, wherein R, $R^1$, $R^2$, $R^N$, and n are as defined above and x and y are mole fractions wherein x+y=1, and $0 \leq x \leq 1$ and $0 \leq y \leq 1$.

In certain embodiments comprising polyesteramides of Formula I and II, or Formula I, II, and III, particularly preferred materials are those wherein R is —($C_2$-$C_6$)-alkylene, especially —$(CH_2)_4$—. Also preferred are materials wherein $R^1$ at each occurrence is the same and is $C_1$-$C_6$ alkylene, especially —$(CH_2)_4$—. Further preferred are materials wherein $R^2$ at each occurrence is the same and is —($C_1$-$C_6$)-alkylene, especially —$(CH_2)_5$-alkylene. The polyesteramide according to this embodiment preferably has a number average molecular weight (Mn) of at least about 4000, and no more than about 20,000. More preferably, the molecular weight is no more than about 12,000.

For convenience the chemical repeat units for various embodiments are shown independently. The invention encompasses all possible distributions of the w, x, y, and z units in the copolymers, including randomly distributed w, x, y and z units, alternatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units In some embodiments, the number average molecular weight ($M_n$) of the MSA material useful in the present invention is between 1000 g/mol and 30,000 g/mol, inclusive. In some embodiments, $M_n$ of the MSA material is between 2,000 g/mol and 20,000 g/mol, inclusive, preferably 5,000 g/mol to 12,000 g/mol. In more preferred embodiments, $M_n$ of the MSA material is less than 5,000 g/mol. Thus, in some more preferred embodiments, $M_n$ of the MSA material is at least about 1000 g/mol and 4,900 g/mol or less, more preferably 4,500 g/mol or less.

Viscosity of a melt of a preferred MSA material (neat) is characterized as being Newtonian over the frequency range of $10^{-1}$ to $10^2$ radians per second (rad./s.) at a temperature from above a melting temperature $T_m$ up to about 40 degrees Celsius (° C.) above $T_m$, preferably as determined by differential scanning calorimetry (DSC). Depending upon the polymer or oligomer, preferred MSA materials exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For the purposes of the present disclosure, the term Newtonian has its conventional meaning; that is, approximately a constant viscosity with increasing (or decreasing) shear rate of a (MSA) material at a constant testing temperature. The zero shear viscosity of a preferred MSA material is in the range of from 0.1 Pa·s. to 1000 Pa·s., preferably from 0.1 Pa·s. to 100 Pa·s., more preferably from 0.1 to 30 Pa·s., still more preferred 0.1 Pa·s. to 10 Pa·s., between the temperature range of 180° C. and 220° C., e.g., 180° C. and 190° C.

Preferably, the viscosity of a melt of a MSA material useful in the present invention is less than 100 Pa·s. at from above $T_m$ up to about 40° C. above $T_m$. The viscosity of one of the preferred MSA materials is less than 100 Pa·s. at 190° C., and more preferably in the range of from 1 Pa·s. to 50 Pa·s. at 150° C. to 170° C. Preferably, the glass transition temperature of the MSA material is less than 20° C. Preferably, the melting temperature is higher than 60° C. Preferred MSA materials exhibit multiple glass transition temperatures $T_g$. Preferably, the MSA material has a $T_g$ that is higher than −80° C. Also preferably, the MSA material has a $T_g$ that is higher than −60° C.

Tensile modulus of one preferred group of MSA materials is preferably from 4 megapascals (MPa) to 500 MPa at room temperature, preferably 20° C. Tensile modulus testing is well known in the polymer arts.

Preferably, torsional (dynamic) storage modulus of MSA materials useful in the invention is at least 100 MPa at 20° C. More preferably, the storage modulus is at least 200 MPa, still more preferably at least 300 MPa, and even more preferably greater than 400 MPa, all at 20° C.

Preferably, polydispersities of substantially linear MSA materials useful in the present invention is 4 or less, more preferably 3 or less, still more preferably 2.5 or less, still more preferably 2.2 or less.

In some embodiments, the polymers described herein are modified with, for example and without limitation thereto, other polymers, resins, tackifiers, fillers, oils and additives (e.g. flame retardants, antioxidants, pigments, dyes, and the like).

The Invention Polymer Inorganic Clay Composite

Preferably, the inorganic clays comprise a total of at least 1 wt %, more preferably at least 10 wt %, still more preferably at least 20 wt %, and even more preferably at least 30 wt % of the polymer inorganic clay composite of the first embodiment based on total weight of the polymer inorganic clay composite. Also preferably, the inorganic clays comprise a total of about 80 wt % or less, more preferably about 70 wt % or less, still more preferably about 60 wt % or less, and even more preferably about 50 wt % or less of the polymer inorganic clay composite of the first embodiment based on total weight of the polymer inorganic clay composite.

A preferred polymer inorganic clay composite of the first embodiment is characterized, when its MSA material is a melt, as having a zero shear viscosity of less than 10,000,000 Pa·s., more preferably 1,000,000 Pa·s. or less, still more preferably 1000 Pa·s. or less, and even more preferably 500 Pa·s. or less at from above $T_m$ up to about 40° C. above $T_m$ of the MSA material, preferably from 150° C. to 180° C.

Another preferred polymer organoclay composite is characterized as having a storage modulus (G') compared to G' of the MSA material alone (i.e., unfilled), of 1.1 times or higher, more preferably 1.2 times or higher, still more preferably 2 times or higher, even more preferably 3 times or higher, and yet more preferably 5 times or higher, all at 25° C. In some embodiments, G' of the polymer organoclay composite is 150 megaPascals (MPa) or higher than G' of the MSA material alone, all such storage moduluses being determined at 25° C. In other embodiments, G' of the polymer organoclay composite is 400 MPa or higher, more preferably 600 MPa or higher, and still more preferably 800 MPa or higher, all at 25° C. Storage modulus G' is measured by dynamic mechanical spectroscopy (DMS) according to the method described later.

The Process of Making the Invention Polymer Inorganic Clay Composite

In some embodiments, the MSA material and inorganic clay are exfoliatably contacted (e.g., compounded or blended under shear) at a temperature of 30° C. or higher and 350° C. or less, provided the temperature is above the MSA material's glass transition temperature ($T_g$) or melt temperature ($T_m$), whichever is higher. In some embodiments, the MSA material and inorganic clay are compounded at a pressure of 0.1 atmosphere (ATM) to 1000 ATM.

Preferably, temperature of the melt comprising the MSA material during the exfoliatably contacting with (dispersing of) inorganic clay therein is less than 250° C., more preferably less than 200° C., and still more preferably less than 180° C.

The relatively low temperature of the melt comprising the MSA material and relatively low shear stress during the exfoliatably contacting (e.g., mixing and delaminating) of inorganic clay thereto as compared to, for example, the temperature of, and shear stress during exfoliatably contacting, a comparator melt comprising a thermoplastic non-MSA polymer to the inorganic clay, is preferred for MSA materials having the zero shear viscosities described previously (e.g., preferably in the range of from 1 Pa·s. to 50 Pa·s. at 150° C. to 170° C.).

In some embodiments, the melt or solution comprising a MSA material comprises one MSA material. In other embodiments, the melt or solution comprises a mixture of two or more different MSA materials.

The Article Comprising the Polymer Inorganic Clay Composite of the First Embodiment In some embodiments, the article comprises packaging, a blow molded article, a membrane, catalyst bed, thermal insulation, electrical insulation, or an electrical conductor. In other embodiments, the article comprises a bandage, medical gown, medical scaffold, cosmetic, sound insulation, barrier material (e.g., house wrap or food packaging), diaper coverstock, adult incontinence pants, training pants, underpad, feminine hygiene pad, wiping cloth, porous filter medium (e.g., for filtering air, gasses, or liquids), durable paper, fabric softener, home furnishing, floor covering backing, geotextile, apparel, apparel interfacing, apparel lining, shoe, industrial garment, protective garments and fabrics, agricultural fabric, automotive fabric, coating substrate, laminating substrate, leather, or electronic component.

In some embodiments, the article comprises the gas permeable membrane. The gas permeable membrane preferably is prepared by extruding the polymer inorganic clay composite of the first embodiment (as a mixture comprising the inorganic clay and a melt of the MSA material) as a film or sheet. In other embodiments, the gas permeable membrane is produced via solution casting to form a film, sheet, symmetric hollow fiber, or asymmetric hollow-fiber.

The Process of the Fourth Embodiment

The process of the fourth embodiment comprises a one-pass process or a multiple-pass (i.e., two or more passes) process. For example, in the one-pass process of the fourth embodiment, the first permeant gas is not sent back to the entrance face of the gas permeable material. Instead, the first permeant gas may be provided to, for example, a storage means (e.g., gas cylinder), manufacturing process, or vented.

In the multiple-pass process aspect of the fourth embodiment, the first permeant gas is contacted to the entrance face of the gas permeable material. Particularly, the multiple-pass process aspect of the fourth embodiment comprises further steps of contacting the first permeant gas to the entrance face of the gas permeable material; and removing from the exit face of the gas permeable material a second permeant gas comprising a second amount of at least some of the water vapor from the hydrous gas mixture, wherein the second amount is greater than the first amount.

If desired, the further steps of the multiple-pass process may be repeated one or more times (thereby providing a three-pass or more operation, respectively) until the ultimate permeant gas contains all of the water vapor from the hydrous gas mixture or the ultimate permeant gas comprises a desired ultimate amount or higher of the water vapor from the hydrous gas mixture. For example, if the multiple-pass process is repeated 8 more times, thereby giving a total of 10 passes, then the ultimate permeant gas is a tenth permeant gas and the ultimate amount is a tenth amount. Reaching the desired ultimate amount or higher of the water vapor in the ultimate permeant gas includes reaching a steady-state concentration of the water vapor in the ultimate permeant gas.

A person of ordinary skill in the art may determine a number of the passes appropriate for a particular situation without undue experimentation. The determination may depend on factors such as, for example, an initial concentration of water vapor in the hydrous gas mixture, separation efficiency of the gas permeable material, how the ultimate permeant gas will be employed, and whether or not additional water vapor separation means are employed in conjunction with the present invention process. The ordinary skilled person may determine amounts of water vapor in successive permeant gases without undue experimentation by employing a conventional water vapor measurement device. Examples of such devices are an electrolytic hygrometer, piezoelectric sorption instrument (also known as quartz crystal microbalance), aluminum oxide sensor, infrared hygrometer, Lyman-Alpha hygrometer, and tunable diode laser (TDL; for TDL absorption spectroscopy).

Materials and Methods

Materials

CLOISITE™ Na+ (Southern Clay Products, Inc.) is a natural sodium montmorillonite inorganic clay having CAS No. 1318-93-0. CLOISITE™ Na+ is commercially obtained from Southern Clay Products, Inc., Gonzales, Tex., USA.

Procedure for Determining Number Average Molecular Weight ($M_n$) of a MSA Material by Nuclear Magnetic Resonance Spectroscopy Proton nuclear magnetic resonance spectroscopy (proton NMR or $^1$H-NMR) is used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperatures utilized for measurement. For ester amide monomers and co-polyesteramides, d4-acetic acid is a convenient solvent and is the solvent used unless otherwise noted. For ester amide monomers of the type called DD that are methyl esters typical peak assignments are about 3.6 to 3.7 ppm for $C(=O)-OCH_3$; about 3.2 to 3.3 ppm for $N-CH_2-$; about 2.2 to 2.4 ppm for $C(=O)-CH_2-$; and about 1.2 to 1.7 ppm for $C-CH_2-C$. For co-polyesteramides that are based on DD with 1,4-butanediol, typical peak assignments are about 4.1 to 4.2 ppm for $C(=O)-OCH_2-$; about 3.2 to 3.4 ppm for $N-CH_2-$; about 2.2 to 2.5 ppm for $C(=O)-CH_2-$; about 1.2 to 1.8 ppm for $C-CH_2-C$, and about 3.6 to 3.75 $-CH_2OH$ end groups.

Compounding Procedure for Preparing Polymer Inorganic Clay Composites

Prior to compounding, all MSA materials and inorganic clays are pre-weighed and stored separately. In the following procedure, the MSA materials and inorganic clays are not dried before blending. A Haake PolyLab Rheocord blender (Haake) is outfitted with a 20 milliliter (mL) bowl. Temperatures of all zones of the Haake mixer are set to 160° C. An air cooling hose is attached to the central one of the zones in order to maintain temperature control. The MSA material is loaded into the 20 mL bowl and allowed to melt. Inorganic clays are added directly to the MSA material melt. Then, a plunger is lowered into the Haake, and the melt of the MSA material with inorganic clay (which does not melt) is compounded at a rotor speed of 200 revolutions per minute (rpm), and a residence time of approximately 2.5 minutes. The residence time begins with the lowering of the plunger, and ends with the raising the plunger. Table 1 presents the timing for the compounding.

TABLE 1

Summary of composite compounding procedure

| Time | rpm | Comment |
| --- | --- | --- |
| 0 second | 200 | |
| 10 seconds | 50 | Add MSA material |
| 1 minute 10 seconds | 200 | Allow MSA material to melt |
| 1 minute 30 seconds | 200 | Add inorganic clay or other fillers |
| 2 minutes 30 seconds | 200 | Compound to give composite |
| 5 minutes | 0 | Recover composite |

Compression Molding Procedure:

Prior to molding, all samples are allowed to dry overnight (at least 16 hours) at 65° C. in a vacuum of approximately 36 cmHg. Samples are compression molded into 10 cm×10 cm×0.05 cm plaques and 5 cm×1.25 cm×0.32 cm bars using a MPT-14 compression/lamination press (Tetrahedron Associates, Inc., San Diego, Calif., USA). The molding parameters for composites comprising the MSA material of Preparation 1C are listed in Table 2.

TABLE 2

Summary of compression molding parameters for composites comprising the MSA material of Preparation 1C

| Step | Temperature (° C.) | Temperature ramp rate (° C./minute) | Load, kg (klb) | Load ramp rate, kg/minute (klb/min) | Time (minutes) |
| --- | --- | --- | --- | --- | --- |
| 1 | 140 | 93 | 608 (1.5) | $317 \times 10^3$ (1200) | 5 |
| 2 | 140 | 93 | 4536 (10) | $317 \times 10^3$ (1200) | 4 |
| 3 | 140 | 93 | 18143 (40) | $317 \times 10^3$ (1200) | 3 |
| 4 | 37.8 | 93 | 450 (1) | $317 \times 10^3$ (1200) | 5 |
| 5 | End | | | | |

Thermogravimetric Analysis (TGA) Procedure:

Samples weighing between 5 milligrams (mg) and 10 mg are loaded into an aluminum TGA pan and heated to 500° C. at a rate of 10° C./minute in a TA Instruments Q5000 TGA in a nitrogen gas atmosphere. TGA is used to determine actual concentration of inorganics in a composite. In order to compare the concentration results obtained with TGA to predicted concentrations of inorganic clays based on amounts of inorganic clays used in composite preparations, weights of the inorganic residue resulting from TGA must be divided by weight loss upon ignition for that clay. Plot results as weight percent (weight %) versus temperature (° C.), wherein weight percent means residual weight of a sample as a percent of original weight of the sample.

Transmission Electron Microscope (TEM) Imaging Procedure:

Samples, approximately 0.5 mm in thickness, are cut from the compression molded plaques and mounted in a chuck for ultracryomicrotomy. Cross-sectional to the thickness, the samples are trimmed into a trapezoid and cooled to −100° C. in the microtome. Thin-sections, approximately 80 nm thick, are then obtained with a Leica UC6:FC6 cryo-microtome and examined in a JEOL 1230 TEM at 120 KeV. Digital images of the microstructure are recorded at various magnifications (typically 50,000 times magnification) using a Gatan Mullica 794 camera. Show magnified TEM images as black-and-white photographs.

Dynamic Mechanical Spectroscopy (DMS) Procedure

Prior to conducting DMS experiments, all samples are exposed to laboratory atmosphere for at least 40 hours to allow for sample equilibration to the test environment. Samples are in the form of the 5 cm×1.25 cm×0.32 cm compression molded bars, which are loaded into torsional rectangular holders of an Ares Rheometer from TA Instruments. Initially, a dynamic strain sweep is conducted at 1 Hz and 25° C. beginning at a strain of 0.001%. For each sample a strain value is obtained from a region where storage modulus (G') is linear over a range of strain values. This strain value is used for subsequent dynamic frequency sweeps and dynamic temperature ramps. Using the strain value obtained during the strain sweep, a frequency sweep is conducted at 25° C. The frequency ranged from 100 radians per second (rad/s.) to 0.01 rad/s. Finally, a temperature ramp is conducted from −80° C. to 100° C. at a heating rate of 5° C./minute. The frequency is held constant at 1 Hz. Plot results as storage modulus, G', in Pascals (Pa) versus temperature (° C.).

Water Vapor and Oxygen Gas Permeation Testing Procedures

Oxygen gas ($O_2$) transport: $O_2$ transport across pure MSA material and invention nanocomposite samples are conducted on a Mocon Ox-Tran® 2/21 oxygen transmission rate testing instrument (MOCON, Inc., Minneapolis, Minn., USA). A sample is a 10 cm×10 cm×0.05 cm compression molded plaque, which has spaced-apart entrance and exit faces that, when used in the Mocon Ox-Tran® 2/21, lack fluid communication with each other except through the plaque. Temperature of the Mocon Ox-Tran® 2/21 is set to 23° C. and barometric pressure is about 750 mmHg (100 kiloPascals (kPa)). The testing procedure employs the hydrous gas mixture (feed gas) and a carrier gas (2 mol % hydrogen in nitrogen), which transports downstream permeant gas away from the exit face of the plaque. Relative humidity of the hydrous gas and the carrier gas is about 50% each. The downstream permeant gas comprises oxygen that has moved through the plaque. Oxygen permeability is reported in terms of the cubic centimeters (cc) of oxygen at standard pressure and temperature that can pass through a plaque that is 1 mil (0.001 inch, 0.0254 millimeter) thick and 100 square inches ($in^2$) in surface area in 1 day (cc mil/100 $in^2$/day), where standard temperature and pressure are 25° C. and 1 atmosphere (101 kPa).

Water vapor transport: samples previously tested in the $O_2$ transport experiments are transferred to a Mocon Permatran-W® 700 moisture vapor transmission rate testing instrument (MOCON, Inc.) comprising a water vapor sensor. Water vapor transport experiments are conducted at about 38° C., 760 mmHg barometric pressure, and 100% relative humidity. A carrier gas is 100% dry (i.e., anhydrous) nitrogen gas and the hydrous gas mixture (i.e., test gas) comprises water vapor in air. The hydrous gas mixture is generated from a wet sponge disposed near the entrance face of the plaque. The carrier gas sweeps any water vapor that has permeated through the plaque away from the exit face of the plaque to the water vapor sensor. Water vapor permeability is reported in terms of the grams of water vapor that can pass through and plaque that is 1 mil thick and 100 $in^2$ in surface area in 1 day (gm mil/100 $in^2$/day).

Melt Viscosity Measurement Procedure

Samples are die cut from a plaque of composite. Parallel plate geometry holders in an Ares Rheometer (TA Instruments) are heated to 170° C. The holders are zeroed at temperature. A sample is loaded onto the holders, and the top holder is lowered into that sample so that there is significant normal force on the sample. The sample is allowed to melt, and any melted sample that extends beyond the holders is removed. Initially, a dynamic strain sweep is conducted at 1 Hz and 170° C. beginning at a strain of 0.1%. For each sample, a strain value is obtained from a region where the loss modulus (G") is linear over a range of strain values. This strain value is used for subsequent dynamic frequency sweeps. Using the strain value obtained during the strain sweep, a frequency sweep is conducted at 170° C. The frequency ranged from 100 rad/s. to 0.1 rad/s. Plot results as viscosity in Pascal-seconds (Pa·s.) versus frequency in radians per second (rad/s.).

Preparations

Preparations 1A, 1B, and 1C: preparation of MSA material that is a polyesteramide (PEA) comprising 50 mole percent of ethylene-N,N'-dihydroxyhexanamide (C2C) monomer (the MSA material is generally designated as a PEA-C2C50%)

Step (a) Preparation of the Diamide Diol, Ethylene-N,N'-Dihydroxyhexanamide (C2C) Monomer The C2C diamide diol monomer is prepared by reacting 1.2 kg ethylene diamine (EDA) with 4.56 kilograms (kg) of ε-caprolactone under a nitrogen blanket in a stainless steel reactor equipped with an agitator and a cooling water jacket. An exothermic condensation reaction between the ε-caprolactone and the EDA occurs which causes the temperature to rise gradually to 80 degrees Celsius (° C.). A white deposit forms and the reactor contents solidify, at which the stirring is stopped. The reactor contents are then cooled to 20° C. and are then allowed to rest for 15 hours. The reactor contents are then heated to 140° C. at which temperature the solidified reactor contents melt. The liquid product is then discharged from the reactor into a collecting tray. A nuclear magnetic resonance study of the resulting product shows that the molar concentration of C2C diamide diol in the product exceeds 80 percent. The melting temperature of the C2C diamide diol monomer product is 140° C.

Step (b): Contacting C2C with Dimethyl Adipate (DMA)

A 100 liter single shaft Kneader-Devolatizer reactor equipped with a distillation column and a vacuum pump system is nitrogen purged, and heated under nitrogen atmosphere to 80° C. (based on thermostat). Dimethyl adipate (DMA; 38.324 kg) and C2C diamide diol monomer (31.724 kg) are fed into the kneader. The slurry is stirred at 50 revolutions per minute (rpm).

Step (c): Contacting C2C/DMA with 1,4-Butanediol, Distilling Methanol and Transesterification 1,4-Butanediol (18.436 kg) is added to the slurry of Step (b) at a temperature of about 60° C. The reactor temperature is further increased to 145° C. to obtain a homogeneous solution. Still under nitrogen atmosphere, a solution of titanium(IV) butoxide (153 g) in 1.380 kg 1,4-butanediol is injected at a temperature of 145° C. into the reactor, and methanol evolution starts. The temperature in the reactor is slowly increased to 180° C. over 1.75 hours, and is held for 45 additional minutes to complete distillation of methanol at ambient pressure. 12.664 kilograms of methanol are collected.

Step (d): Distilling 1,4-butanediol and Polycondensation to Give PEA-C2C50%

Reactor dome temperature is increased to 130° C. and the vacuum system activated stepwise to a reactor pressure of 7 mbar (0.7 kiloPascals (kPa)) in 1 hour. Temperature in the kneader/devolatizer reactor is kept at 180° C. Then the vacuum is increased to 0.7 mbar (0.07 kPa) for 7 hours while the temperature is increased to 190° C. The reactor is kept for 3 additional hours at 191° C. and with vacuum ranging from 0.87 to 0.75 mbar. At this point a sample of the reactor contents is taken (Preparation 1A); melt viscosities were 6575 megaPascals (MPa) at 180° C. and 5300 MPa at 190° C. The reaction is continued for another 1.5 hours until the final melt viscosities are recorded as 8400 MPa at 180° C. and 6575 MPa at 190° C. (Preparation 1B). Then the liquid Kneader/Devolatizer reactor contents are discharged at high temperature of about 190° C. into collecting trays, the polymer is cooled to room temperature and grinded. Final product is 57.95 kg (87.8% yield) of melt viscosities 8625 MPa at 180° C. and 6725 MPa at 190° C. (Preparation 1C). Preparations 1A to 1C have the data shown below in Table 3.

TABLE 3

Melt viscosities and molecular weights of samples of MSA Copolyesteramide

| Hours in full vacuum* | Preparation Number | Spindle No. 28** (rpm) | Viscosity at 180° C. (MPa) | Viscosity at 190° C. (MPa) | $M_n$ by 1H-NMR (g/mol) |
|---|---|---|---|---|---|
| 10 | 1A | 20 | 6575 | 5300 | 6450 |
| 11.5 | 1B | 20 | 8400 | 6575 | 6900 |
| 11.5 | 1C | 20 | 8625 | 6725 | 7200 |

*Vacuum < 1.2 mbar
**Viscometer used: Brookfield DV-II+ Viscometer ™

COMPARATIVE EXAMPLES

COMPARATIVE EXAMPLE 1

Unfilled PEA-C2C50% of Preparation 1C

Figure 1:
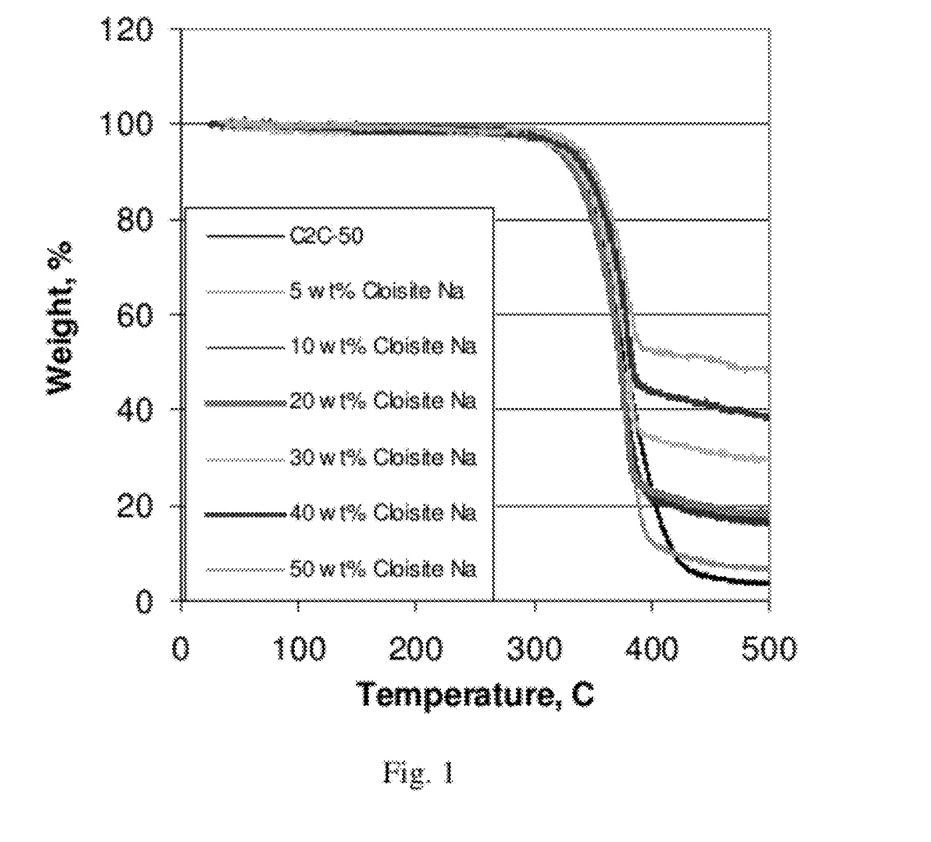
FIG. 1 graphically depicts thermogravimetric analysis (TGA) results for Comparative Example 1 and Examples 1-6.

Separate samples of the PEA-C2C50% of Preparation 1C are compression molded or prepared as plaques and subjected to TGA, oxygen and water vapor permeation testing, melt viscosity measurements, and DMS according to the procedures described above. TGA results are shown as parts of FIG. 1. Oxygen permeation testing results are shown as part of FIG. 3. Water vapor permeation results are shown as part of FIG. 4. Melt viscosity results are shown as part of FIG. 5. DMS results are shown as part of FIG. 6. In the figures, the unfilled PEA-C2C50% of Preparation 1C is referred to as "Unfilled," "C2C-50," 0 wt % inorganic clay, or "C2C-50 (unfilled)."

EXAMPLES OF THE PRESENT INVENTION

EXAMPLES 1 to 6

Composite Comprising the PEA-C2C50% of Preparation 1C and CLOISITE™ Na$^+$

Separate weighed samples of the PEA-C2C50% of Preparation 1C are compounded with weighed amounts of CLOISITE™ Na$^+$ according to the compounding procedure for preparing polymer inorganic clay composites described above to give invention polymer inorganic clay composites respectively having 5 wt %, 10 wt %, 20 wt %, 30 wt %, 40 wt %, or 50 wt % of the CLOISITE™ Na$^+$ as shown in Table 4.

TABLE 4 composites of Examples 1 to 6:

| | Example Number: | | | | | |
|---|---|---|---|---|---|---|
| | 1 | 2 | 3 | 4 | 5 | 6 |
| Amount of CLOISITE ™ Na$^+$ (wt %) | 5 | 10 | 20 | 30 | 40 | 50 |

Figures 2A, 2B:
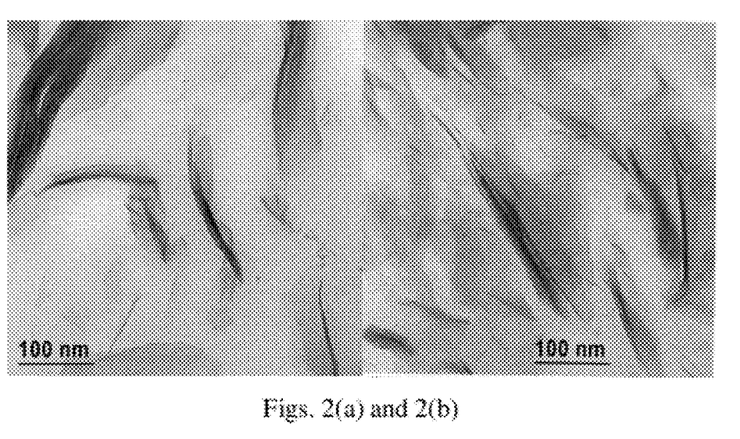
FIGS. 2(a) and 2(b) are transmission electron microscope (TEM) images at 50,000 times magnification of the invention composites of Examples 5 and 6, respectively.
Figure 3:
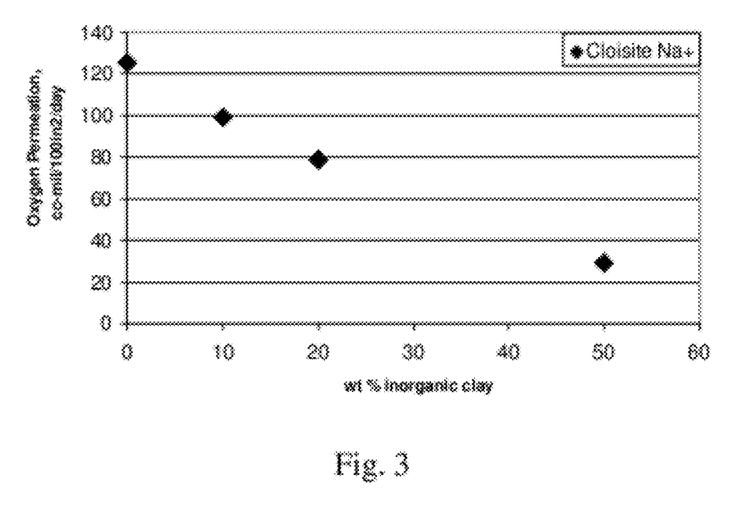
FIG. 3 graphically depicts oxygen permeation testing results for the MSA material of Comparative Example 1 and the invention composites of Examples 2, 3, and 6.
Figure 4:
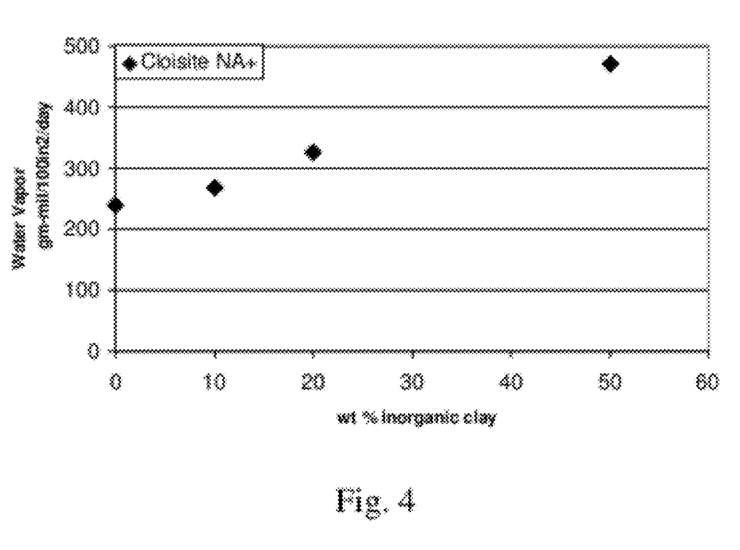
FIG. 4 graphically depicts water vapor permeation testing results for the MSA material of Comparative Example 1 and the invention composites of Examples 2, 3, and 6.
Figure 5:
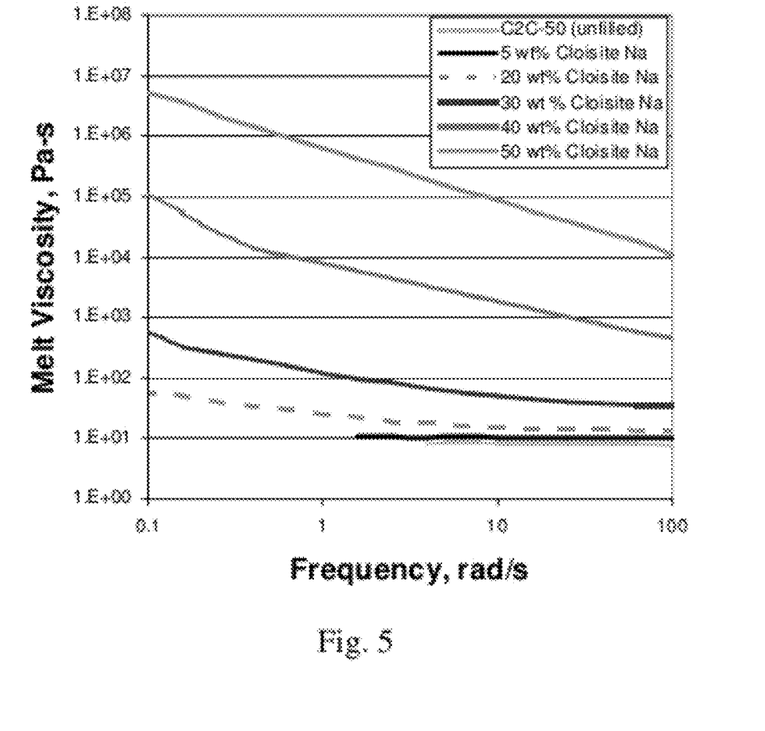
FIG. 5 graphically depicts melt viscosity results for the MSA material of Comparative Example 1 and the invention composites of Examples 1 and 3-6.
Figure 6:
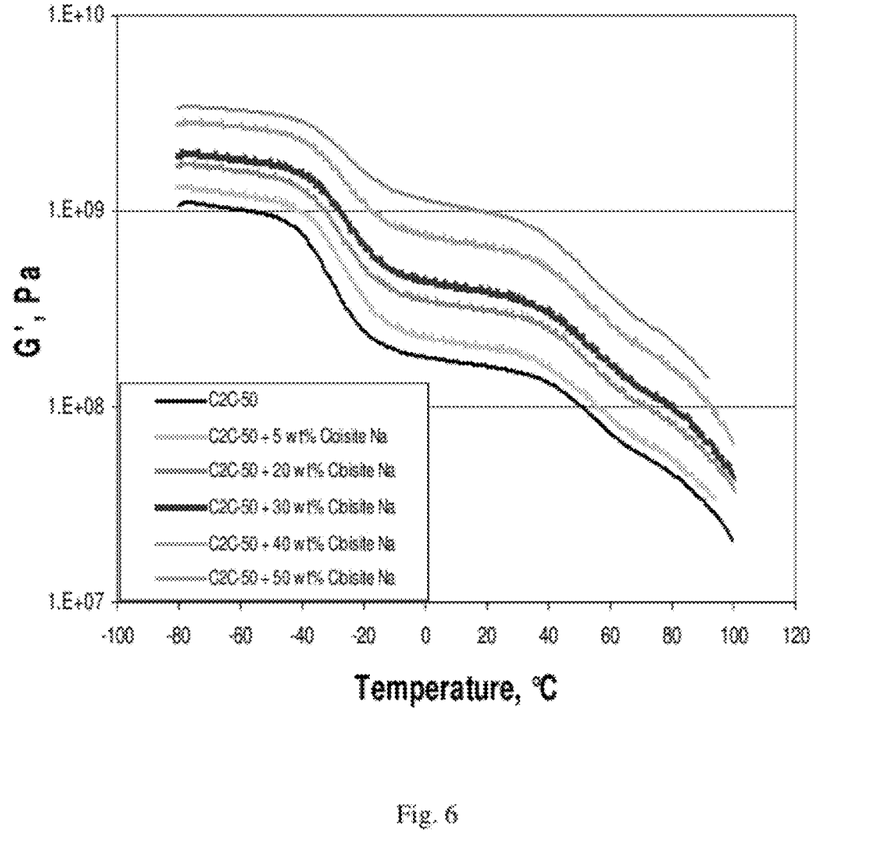
FIG. 6 graphically depicts dynamic mechanical spectroscopy (DMS) results for the MSA material of Comparative Example 1 and the invention composites of Examples 1 and 3-6.

Separate samples of the composites of Examples 1 to 6 are compression molded or prepared as plaques, and subjected to TGA, TEM imaging, oxygen and water vapor permeation testing, melt viscosity measurements, and DMS according to the procedures described above. TGA results are shown as parts of FIG. 1. The TGA results show that the CLOISITE™ Na$^+$ is present in the composites at loadings similar to the loading that is intended. TEM imaging results are shown in FIGS. 2(*a*) and 2(*b*), which show the CLOISITE™ Na$^+$ is present and dispersed in the composites. Oxygen permeation testing results are shown in FIG. 3, which shows that oxygen permeability decreases with increasing CLOISITE™ Na$^+$ concentration in the composites. Water vapor permeation results are shown in FIG. 4, which shows that water vapor permeability increases with increasing CLOISITE™ Na$^+$ concentration in the composites. Melt viscosity results are shown as part of FIG. 5. In FIG. 5, "1.E+01," for example, means 1 times 10 to the first power. The results in FIG. 5 demonstrate that the melt viscosity of the highly filled MSA is still below 10,000,000 Pa·S. Thus, the composites are still processable using many different types of melt processing equipment. DMS results are shown as parts of FIG. 6. The DMS results demonstrate G' increases with increasing CLOISITE™ Na$^+$ loading. In the figures, the CLOISITE™ Na$^+$ composites of Examples 1-6 are referred to by their respective weight percents of CLOISITE™ Na$^+$.

While the invention has been described above according to its preferred embodiments of the present invention and examples of steps and elements thereof, it may be modified within the spirit and scope of this disclosure. This application is therefore intended to cover any variations, uses, or adaptations of the instant invention using the general principles disclosed herein. Further, this application is intended to cover such departures from the present disclosure as come within the known or customary practice in the art to which this invention pertains and which fall within the limits of the following claims.

What is claimed is:

1. A polymer inorganic clay composite comprising a molecularly self-assembling (MSA) material and an inorganic clay dispersed in the MSA material, wherein the inorganic clay consists essentially of a cation exchanging layered material and inorganic cations, the cation exchanging layered material having a cation exchanging capacity, and the inorganic clay having at least one dimension that is less than 3 micrometers and comprising from 1 weight percent to 90 weight percent of the polymer inorganic clay composite based on total weight of the polymer inorganic clay composite, wherein the inorganic clay is not magadiite or a synthetic hydrous magnesium silicate clay.

2. The polymer inorganic clay composite as in claim 1, wherein the inorganic clay comprises the cation exchanging layered material and a mixture of native and active inorganic cations, the cation exchanging layered material having a cation exchanging capacity that is less than 100 mole percent exchanged with the active inorganic cations.

3. The polymer inorganic clay composite as in claim 1, wherein the inorganic clay consists essentially of the cation exchanging layered material and active inorganic cations, the cation exchanging layered material having a cation exchanging capacity that is 100 mole percent or more exchanged with the active inorganic cations.

4. The polymer inorganic clay composite as in claim 1, wherein when the MSA material is in a form of a melt, the polymer inorganic clay composite being characterized by a zero shear viscosity of less than 10,000,000 Pascal-seconds at from above $T_m$ up to about 40° C. above $T_m$ of the MSA material.

5. The polymer inorganic clay composite as in claim 1, the polymer inorganic clay composite being characterized by a storage modulus that is at least 1.1 times higher than a storage modulus of the MSA material alone, each storage modulus being determined at 25° C. and a frequency ranged from 100 radians per second to 0.01 radians per second.

6. The polymer inorganic clay composite as in claim 1, wherein the molecularly self-assembling material is a polyester-amide, poly ether-amide, polyester-urethane, poly ether-urethane, polyether-urea, polyester-urea, or a mixture thereof.

7. The polymer inorganic clay composite as in claim 1, wherein the MSA material comprises self-assembling units comprising multiple hydrogen bonding arrays.

8. The polymer inorganic clay composite as in claim 1, wherein the molecularly self-assembling material comprises repeat units of formula I Formula I and at least one second repeat unit selected from the ester-amide units of Formula II and III:

Formula II

Formula III and the ester-urethane units of Formula IV:

Formula IV or combinations thereof wherein:
R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole;
$R^1$ at each occurrence independently is a bond or a $C_2$-$C_{20}$ non-aromatic hydrocarbylene group;
$R^2$ at each occurrence independently is a $C_2$-$C_{20}$ non-aromatic hydrocarbylene group;
$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms, wherein each nitrogen atom is bonded to a carbonyl group according to formula (III) above;
n is at least 1 and has a mean value less than 2; and
w represents the ester mol fraction of Formula I, and x, y and z represent the amide or urethane mole fractions of Formulas II, III, and IV, respectively, where w+x+y+z=1, and 0<w<1, and at least one of x, y and z is greater than zero but less than 1.

9. The polymer inorganic clay composite as in claim 1, wherein the MSA material is of Formula II or III:

Formula II
Or

Formula III wherein: R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole;
$R^1$ at each occurrence independently is a bond or a $C_1$-$C_{20}$ non-aromatic hydrocarbylene group;
$R^2$ at each occurrence independently is a $C_1$-$C_{20}$ non-aromatic hydrocarbylene group;
$R^N$ is —N($R^3$)—Ra—N($R^3$)—, where $R^3$ at each occurrence independently is H or a $C_1$-$C_6$ alkylene and Ra is a $C_1$-$C_{20}$ non-aromatic hydrocarbylene group, or $R^N$ is a $C_1$-$C_{20}$ heterocycloalkyl group containing the two nitrogen atoms, wherein each nitrogen atom is bonded to a carbonyl group according to formula (III) above;
n is at least 1 and has a mean value less than 2; and x and y represent mole fraction wherein x+y=1, and 0<x<1, and 0<y<1.

10. The polymer inorganic clay composite as in claim 1, wherein the number average molecular weight (Mn) of the molecularly self-assembling material is between about 1000 grams per mole and about 50,000 grams per mole.

11. The polymer inorganic clay composite as in claim 1, wherein the MSA material itself is characterized by a melt viscosity of less than 100 pascal-seconds (Pa·sec.) at from above melting temperature ($T_m$) up to about 40 degrees Celsius (° C.) above $T_m$.

12. An article comprising the polymer inorganic clay composite as in claim 1.

13. The article as in claim 12, the article comprising packaging, a blow molded article, barrier material, or a membrane.

14. The article as in claim 12, the article comprising a catalyst bed, thermal insulation, electrical insulation, or an electrical conductor.

15. The article as in claim 13, the article comprises a gas permeable material.

16. A process for separating water vapor from a hydrous gas mixture, the process comprising the steps of: providing a gas permeable material comprising an effective amount of the polymer inorganic clay composite as in claim 1, the gas permeable material having spaced-apart entrance and exit faces; and contacting a hydrous gas mixture comprising water vapor and a permeation-resistant gas to the entrance face of the gas permeable material; and removing from the exit face of the gas permeable material a first permeant gas comprising a first amount of at least some of the water vapor from the hydrous gas mixture.

17. The process as in claim 16, wherein the process further comprises steps of contacting the first permeant gas to the entrance face of the gas permeable material; and removing from the exit face of the gas permeable material a second permeant gas comprising a second amount of at least some of the water vapor from the hydrous gas mixture, wherein the second amount is greater than the first amount.

18. The process as in claim 16, wherein the gas permeable material is a gas permeable membrane.

* * * * *